United States Patent [19]

Aoshima

[11] Patent Number: 5,663,941
[45] Date of Patent: Sep. 2, 1997

[54] OPTICAL DISK RECORDING DEVICE WITH LASER POWER CONTROL CAPABLE OF RECORDING AT VARIOUS RECORDING SPEEDS

[75] Inventor: Shinji Aoshima, Hamamatsu, Japan

[73] Assignee: Yamaha Corporation, Hamamatsu, Japan

[21] Appl. No.: 607,373

[22] Filed: Feb. 27, 1996

Related U.S. Application Data

[63] Continuation of Ser. No. 213,155, Mar. 15, 1994, abandoned.

[30] Foreign Application Priority Data

Mar. 19, 1993 [JP] Japan ................................. 5-085222

[51] Int. Cl.$^6$ ........................................................... G11B 7/00
[52] U.S. Cl. ..................................... 369/44.34; 369/44.35; 369/54; 369/116
[58] Field of Search ........................... 369/44.26, 44.34, 369/44.35, 54, 58, 116

[56] References Cited

U.S. PATENT DOCUMENTS

| | | | |
|---|---|---|---|
| 4,426,693 | 1/1984 | Satoh et al. | 369/116 |
| 4,813,034 | 3/1989 | Mashimo | 369/116 |
| 4,937,809 | 6/1990 | Miyadera et al. | 369/116 |
| 4,982,389 | 1/1991 | Nakao et al. | 369/116 X |
| 5,170,382 | 12/1992 | Yamada et al. | |

FOREIGN PATENT DOCUMENTS

| | | |
|---|---|---|
| 4-281217 | 10/1992 | Japan . |
| 4-353628 | 12/1992 | Japan . |

*Primary Examiner*—W. R. Young
*Attorney, Agent, or Firm*—Loeb & Loeb LLP

[57] ABSTRACT

An optical disk recording device for forming a pit on an optical disk by projecting recording laser beam of an amount corresponding to a pit length of the pit to be formed includes a recording speed increase ratio setting section for setting a recording speed increase ratio, a rotation control section for rotating the optical disk at the set recording speed increase ratio, and a laser power control section for controlling laser power of the recording laser beam in a pit period and laser power of the recording laser beam in a bottom period in such a manner that both the laser power in the pit period and the laser power in the bottom period will be increased as the set recording speed increase ratio is increased. When recording is made at a higher recording speed, not only the pit power but also the bottom power of the recording laser beam is increased and, accordingly, difference between the pit power and the bottom power is reduced as compared with a case where the pit power only is increased. Therefore, an adequate time is made available for detection of a tracking error, so that deterioration of the signal-to-noise ratio of a wobble signal can be prevented.

17 Claims, 8 Drawing Sheets

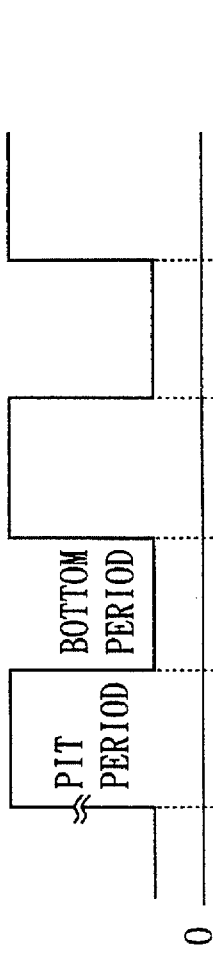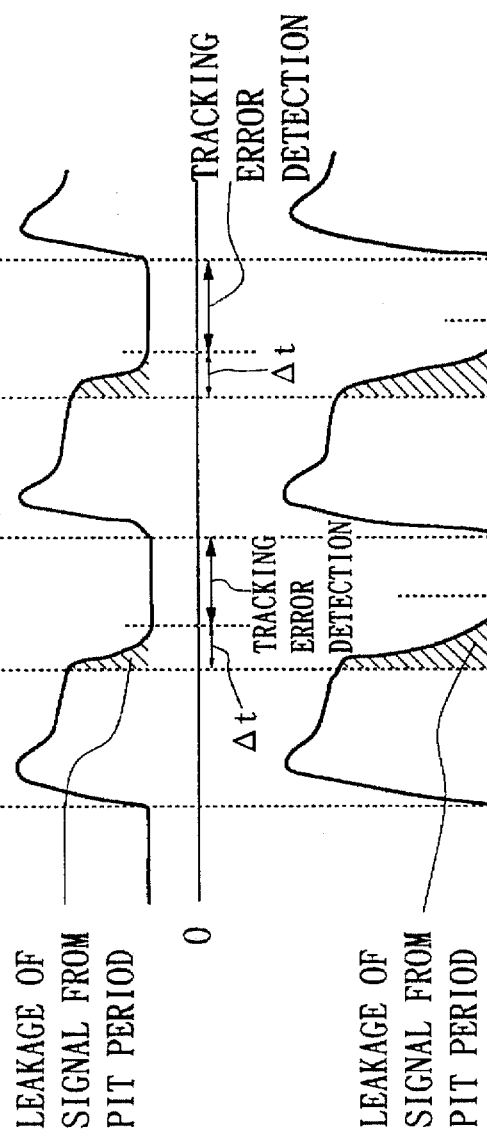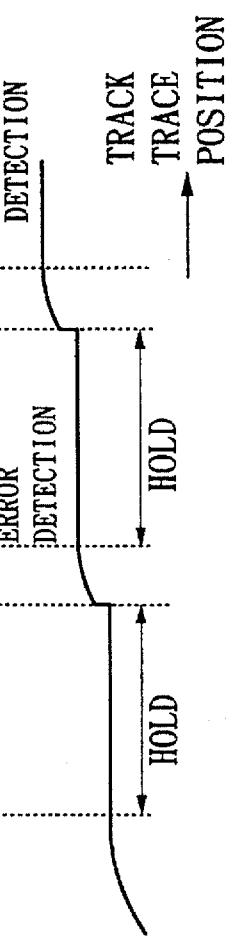
FIG. 3A PRIOR ART LASER DIODE OUTPUT
FIG. 3B PRIOR ART REFLECTED LASER BEAM WAVEFORM (NORMAL SPEED)
FIG. 3C PRIOR ART REFLECTED LASER BEAM WAVEFORM (DOUBLE SPEED)
FIG. 3D PRIOR ART TRACKING ERROR SIGNAL

OPTICAL DISK RECORDING DEVICE WITH LASER POWER CONTROL CAPABLE OF RECORDING AT VARIOUS RECORDING SPEEDS

This is a continuation of application Ser. No. 08/213,155, filed Mar. 15, 1994, now abandoned.

BACKGROUND OF THE INVENTION

This invention relates to an optical disk recording device of a type which records information by projecting a laser beam on a recording surface of an optical disk to form pits thereon and, more particularly, to an optical disk recording device, which is capable of preventing occurrence of an adverse effect on a signal-to-noise ratio of a wobble signal when a recording is made by using a higher recording speed than a normal recording speed.

As a manner of recording information on a write-once type optical disk on the basis of the CD-WO (CD Write Once) standard, it has been proposed to record information by using not only a normal speed but also a higher speed than the normal speed such as a double speed and a quadruple speed. By using such high speed recording, for example a quadruple speed, if is possible to store data such as CD-ROM data and audio data in a hard disk, read the stored data in the form of quadruple compressed data, and record the read out data by driving an optical disk at a quadruple speed. In case a double speed is employed, for example, a Compact Disc player may be driven at a double speed and an optical disk may be driven at a double speed to copy reproduced data.

In a prior art optical disk recording device, it has been proposed to perform a high speed recording by increasing power (pit power) of recording laser beam in a pit forming section (i.e., pit period) as shown in FIG. 2 for accurately forming pits on the optical disk.

According to the CD-WO standard, a groove called "pregroove" is preformed on the recording surface of an optical disk and, during recording of information, recording is made by tracking this pregroove under a tracking control. This pregroove is not a straight line but is undulated with a particular frequency and this undulation is called "wobble". In the recording mode, this wobble is detected on the basis of a residual component of a tracking error signal and a CLV (constant linear velocity) spindle control is realized by PLL-controlling a disk motor so that the frequency of the detected wobble will become a predetermined frequency (e.g., 22.05 kHz in a normal recording speed mode).

If the device is designed in a manner to detect a tracking error constantly, a DC offset component of a tracking error signal will increase and a signal-to-noise ratio will be deteriorated due to influence caused by a signal at a pit position and this will cause an adverse affect on the tracking control and the spindle control based on the wobble signal and will also make it difficult to obtain ATip information (time information) contained in the wobble signal. Therefore, in a bottom period in which a pit is not formed, an attempt has been made to detect a tracking error in only a bottom period in which laser beam of a low power (bottom power) which is insufficient for forming a pit is projected (FIG. 2) and hold a tracking error signal of an immediately preceding value in a pit period.

For detecting a tracking error only in the bottom period, it is necessary, for obtaining a wobble signal of an adequate signal-to-noise ratio, to make as much time as possible in the bottom period available for detection of a tracking error signal. It is therefore desirable to make the whole bottom period available. However, as shown in FIG. 3B, the waveform of the reflected beam from a disk has a delayed trailing edge as compared with a laser diode output shown in FIG. 3A, and this causes leakage (a shaded portion in FIG. 3B) of a signal in the pit period to a bottom period. A frequency range of this leakage signal portion extends over a frequency range of the wobble signal as well as a frequency range of an EFM signal. Therefore, when a tracking error is detected throughout the entire bottom period, the signal-to-noise ratio of the wobble signal is deteriorated rather than improved.

Since the trailing edge of the waveform of the reflected beam from the disk assumes an exponential curve, it is necessary to determine a fall period $\Delta t$ in such a manner that the trailing edge is decayed to such an extent that influence of the signal in the pit period is reduced and an adequate length of a tracking error signal detection period can be made available and to perform detection of a tracking error during the bottom period excluding this fall period $\Delta t$. In this case, the fall period $\Delta t$ is determined at a length at which the best signal-to-noise ratio of the wobble signal is available by minimizing the influence of the signal in the pit period and maximizing the tracking error detection period.

The value of the fall period at thus determined is relatively small when the recording speed is a normal (one time) speed but, when the recording speed becomes higher than the normal speed, a relatively long fall period $\Delta t$ is required as shown in FIG. 3C because it takes more time for the waveform of the reflected beam to decay completely. This results in shortening of the tracking error detection period with resulting deterioration of the signal-to-noise ratio of the wobble signal.

It is, therefore, an object of the invention to provide an optical disk recording device capable of preventing deterioration of signal-to-noise ratio of a wobble signal when the recording speed is changed.

SUMMARY OF THE INVENTION

For achieving the above described object of the invention, according embodiments of to the invention, not only a pit power of recording laser beam but also a bottom power of recording laser beam is increased as a recording speed increase ratio is increased.

For this purpose, an optical disk recording device for forming a pit on an optical disk by projecting recording laser beam of an amount corresponding to a pit length of the pit to be formed comprises recording speed increase ratio setting means for setting a recording speed increase ratio, rotation control means for rotating the optical disk at a recording speed increase ratio set by the recording speed increase ratio setting means, and laser power control means for controlling laser power of the recording laser beam in a pit period and laser power of the recording laser beam in a bottom period in such a manner that both the laser power in the pit period and the laser power in the bottom period will be increased as the set recording speed increase ratio is increased.

According to embodiments of the present invention, in a case where recording is made at a higher recording speed, not only the pit power but also the bottom power of the recording laser beam is increased and, accordingly, a difference between the pit power and the bottom power is reduced as compared with a case where the pit power only is increased. As a result, the time required for the waveform of the reflected beam to fall is reduced and an adequate time is made available for detection of a tracking error, so that deterioration of the signal-to-noise ratio of the wobble signal can be prevented.

Further, since recording is made at a higher recording speed increase ratio, an erroneous forming of a pit can be prevented in spite of the increased bottom power.

Furthermore, according to embodiments of the preset invention, the increase in the bottom power enables the leading edge of a pit power of a next pit period to become sharp and thereby reduces an error in the start position of pit forming.

Preferred embodiments of the invention will be described below with reference to the accompanying drawings.

BRIEF DESCRIPTION OF THE DRAWINGS

In the accompanying drawings,

FIGS. 3A to 3D are waveform diagrams showing change in reflected laser beam waveforms according to the control of FIG. 2;

DESCRIPTION OF PREFERRED EMBODIMENTS

Figure 4:
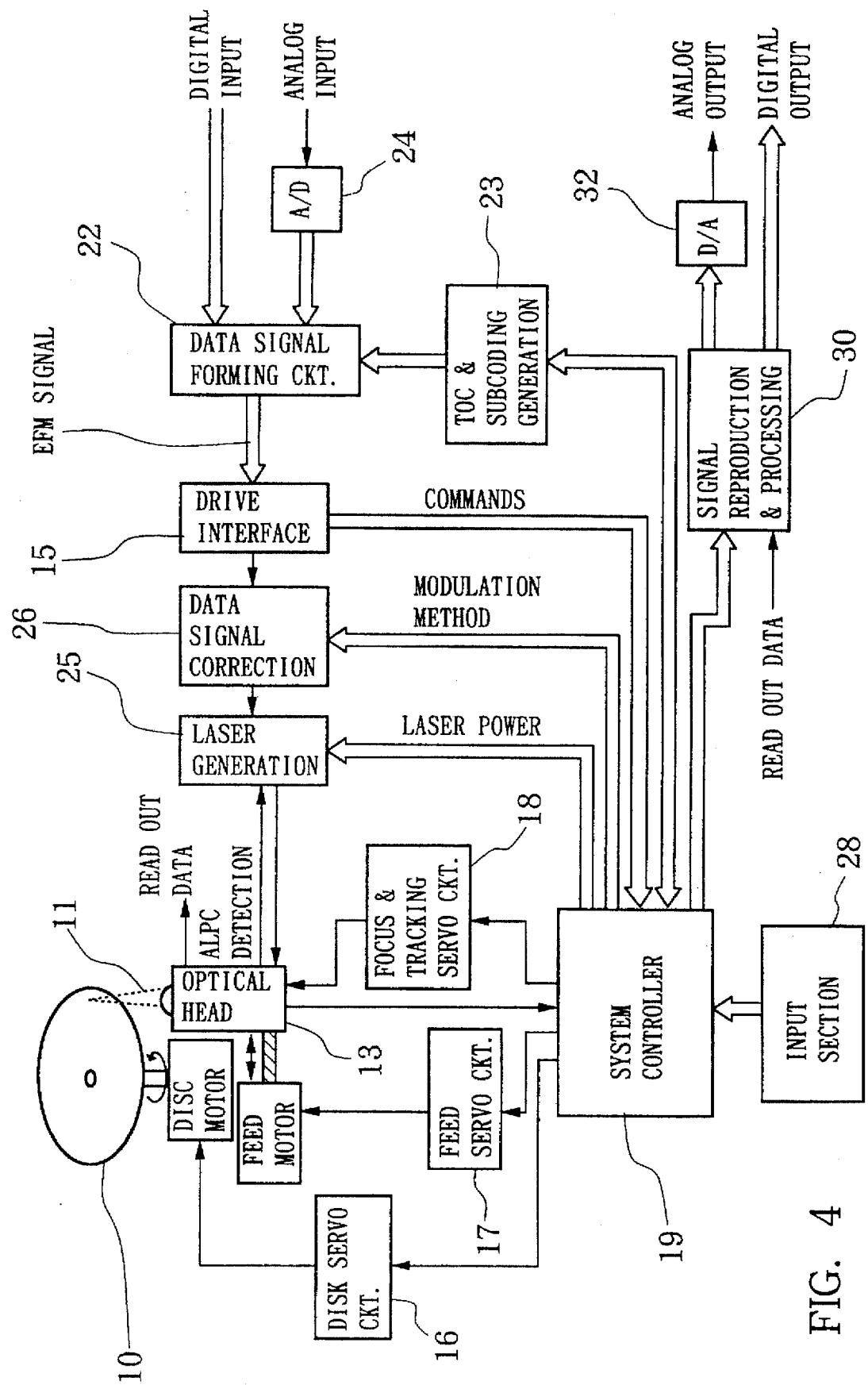
FIG. 4 is a block diagram showing an entire structure of an optical disk recording and reproducing device incorporating an embodiment of the invention.

An embodiment of the invention will now be described. In this embodiment, information is recorded on a write-once type disk of a dye system with the CD-WO standard and a recording speed is variable between one time speed (x1), i.e., normal speed, a double speed (x2) and a quadruple speed (x4). FIG. 4 shows the entire structure of an optical disk recording and reproducing device to which this invention is applied. In an input section 28, a recording speed increase ratio is set by a manual operation by an operator or other means. A disk servo circuit 16 controls rotation of a disk motor at a constant linear velocity and at the set recording speed increase ratio in response to a command from a system controller 19.

A focus servo and tracking servo circuit 18 controls, in response to a command from the system controller 19, a focus and a tracking of laser beam 11 projected from a semiconductor laser provided in an optical head 13. The tracking control is carried out by detecting a pregroove formed on a disk 10. A feed servo circuit 17 drives a feed motor 20 in response to a command from the system controller 19 to displace the optical head 13 in the radial direction of the disk 10.

An input signal to be recorded on the optical disk 10 is applied to a data signal forming circuit 22, directly when the signal is a digital signal or through an analog-to-digital converter when the signal is an analog signal, at a speed corresponding to the set recording speed increase ratio. The data signal forming circuit 22 applies interleave to input data to give an error check code to the input data and provides the input data with TOC information and subcoding information generated by a TOC and subcoding generation circuit 23, and EFM modulates the input data to form and output a series of serial data at a transfer rate based on a format of the CD standard and at the set recording speed increase ratio.

This data is applied through a drive interface 15 to a data signal correction circuit 26 in which the data is subjected to modulation by (n−1) strategy and thereafter is applied to a laser generation circuit 25. The laser generation circuit 25 drives, in response to the data signal, the semiconductor laser in the optical head 13 to project laser beam on the recording surface of the optical disk 10 and thereby record the data by forming pits. The laser power (i.e., pit power and bottom power) during this recording is designated at values corresponding to the recording speed increase ratio according to the invention and is controlled accurately to these designated values by an ALPC (automatic laser power control) circuit provided in the laser generation circuit 25. By this processing, data is recorded on the optical disk 10 in accordance with the format, transfer speed and linear velocity (1.2 m/s to 1.4 m/s) of the CD standard.

When the data is reproduced by projecting reproducing laser beam on the optical disk 10 in which the data has been recorded in the above described manner, the read out data is demodulated by a signal reproduction and processing circuit 30 and is delivered out either directly as a digital signal or an analog signal through a digital-to-analog converter 32.

Figure 1:
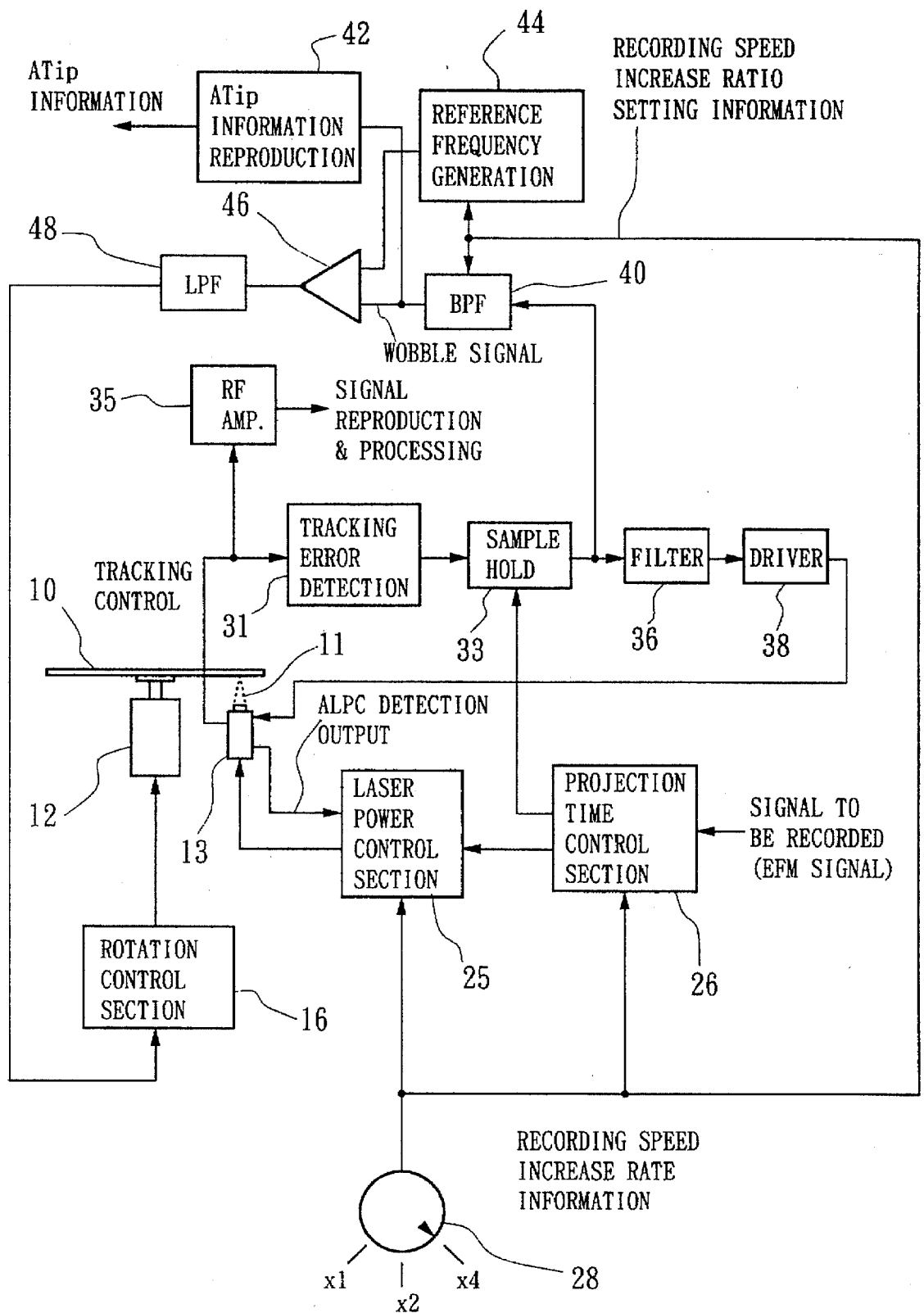
FIG. 1 is a block diagram showing functions of a main portion of an embodiment of an optical disk recording device according to the invention shown in FIG. 4.
Figure 2:
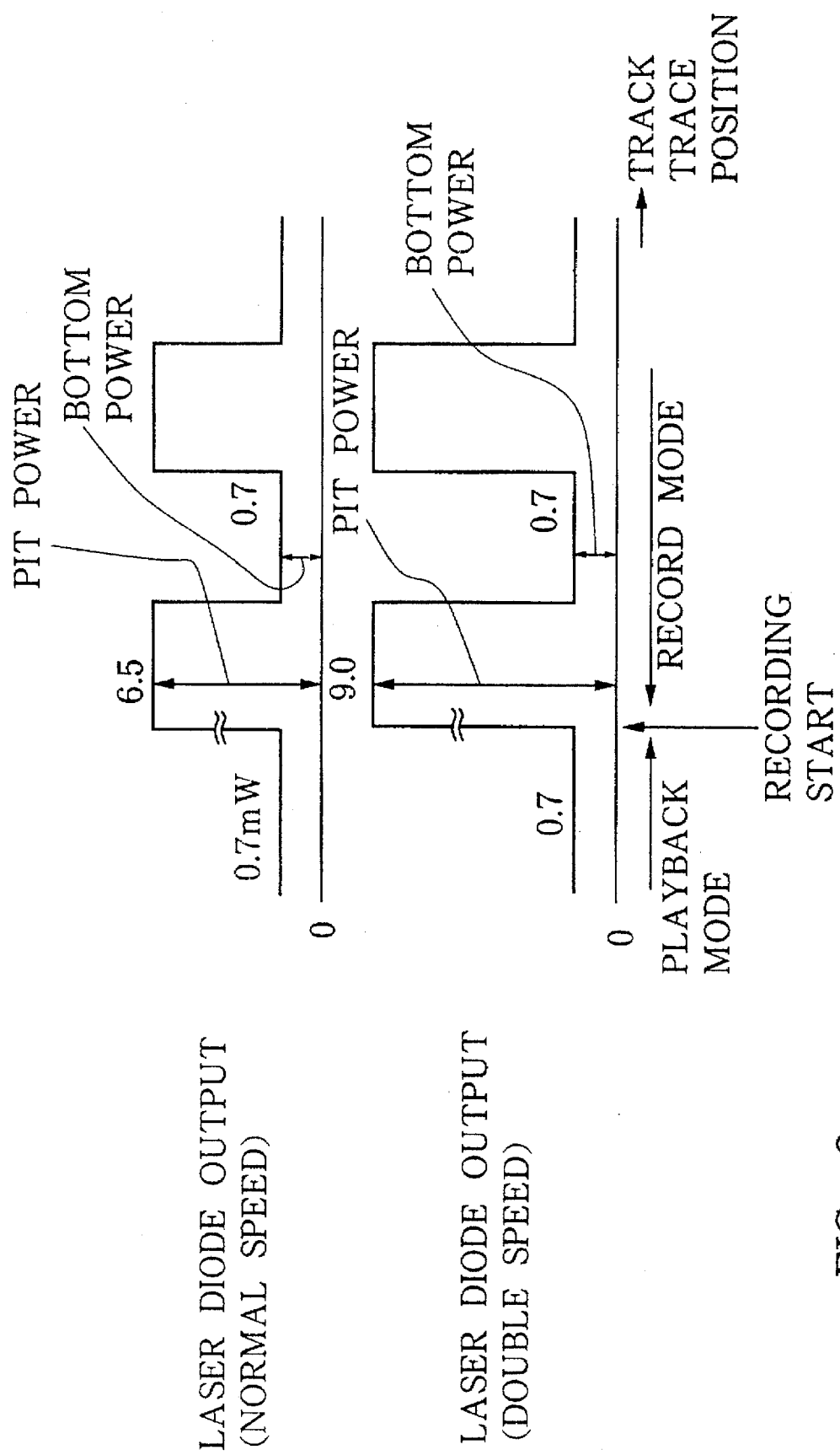
FIG. 2 is a waveform diagram showing a laser power control according to a prior art optical disk recording device.

FIG. 1 is a control block diagram by the optical disk recording and reproducing device of FIG. 4.

A recording speed increase ratio setting section 28 (the input device 28 of FIG. 4) is operated by a manual operation by an operator or other means to set the recording speed increase ratio. A projection time control section 26 (the data signal correction circuit 26 of FIG. 4) subjects an input EFM signal to modulation by (n−1) strategy and thereby controls the projection time of the laser beam 11. A laser power control section 25 (the laser generation circuit 25 of FIG. 4) changes the pit power in the pit period in accordance with the recording speed increase ratio. More specifically, as the recording speed increase ratio becomes larger, an input heat value per unit length decreases and this makes it difficult to form a pit, so that the pit power is increased to form a proper pit. Simultaneously with the increase in the pit power, the bottom power is also increased to avoid change in difference between the pit power and the bottom power so as to prevent increase in the fall time of the reflected laser beam waveform.

The laser beam reflected on the optical disk 10 is received by a beam receiving element in the optical head 13 through an objective lens. This received beam signal is supplied to the signal reproducing and processing circuit 30 (FIG. 4) through an RF amplifier 35.

The tracking error detection circuit 31 detects a tracking error from the received beam signal. The detected tracking error signal is applied to a driver 38 through a sample hold circuit 33 and a filter 36 to drive a tracking actuator in the optical head 13 to perform the tracking control.

The sample hold circuit 33 passes a tracking error signal in the bottom period excluding the fall period of a reflected waveform and holds and outputs an immediately preceding tracking error signal in the pit period and the fall time Δt. The filter 36 is provided for smoothing a step produced in the tracking error signal at a hold releasing timing. In a playback mode, the sample hold circuit 33 constantly passes a tracking error signal without holding.

A bandpass filter 40 extracts a wobble signal from the tracking error signal and outputs it. Since the frequency band of the wobble signal varies depending upon the recording speed increase ratio, that is, 22.05 kHz at the normal speed, 44.1 kHz at the double speed and 88.2 kHz at the quadruple speed, the transmission frequency band of the bandpass filter 40 needs to be changed in accordance with the frequency of the wobble signal. For example, the transmission frequency band is set to 10 kHz to 30 kHz at the normal speed and changed to a frequency band having the frequency of the wobble signal as its center frequency as the recording speed increase ratio is changed. An ATip information detection circuit 42 demodulates and outputs ATip information, i.e., time information, which is contained in the form of FM modulated data in the wobble signal.

A reference frequency generation circuit 44 produces, in response to the set recording speed increase ratio, a reference frequency of the wobble signal, i.e., 22.05 kHz at the normal speed, 44.1 kHz at the double speed and 88.2 kHz at the quadruple speed. A phase comparator 46 compares the phase of the detected wobble signal with the phase of the reference frequency and produces a phase error signal. This phase error signal is smoothed by a low-pass filter 48 and then is applied to a rotation control section 16 (the disk servo circuit 16 of FIG. 4). The rotation control section 16 PLL controls the disk motor 12 so as to bring the phase error to a predetermined value and thereby performs a spindle control of the CLV system.

Figure 5:
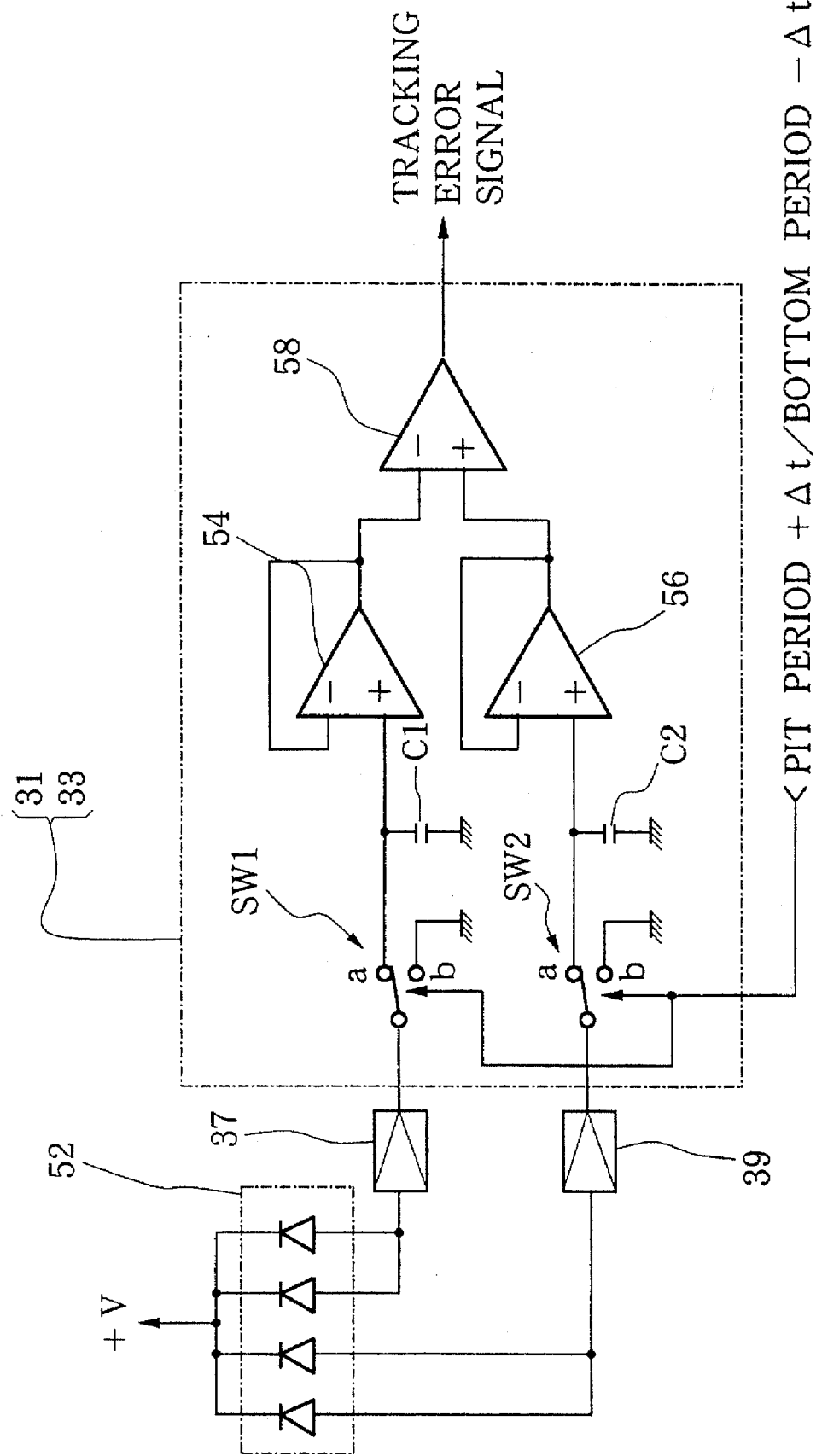
FIG. 5 is a circuit diagram showing an example each of a tracking error detection circuit 31 and a sample hold circuit 33 shown in FIG. 1.

An example of the tracking error detection circuit 31 and an example of the sample hold circuit 33 are shown in FIG. 5. A laser beam detector 52 provided in the optical head 13 is made of a four-split PIN photodiode and detects laser beam reflected from the optical disk 10. Detected signals from split sections on the same side of the track of the laser beam detector 52 are combined together and are applied to the tracking error detection circuit 31 and the sample hold circuit 33 through current-voltage converting amplifiers 37 and 39. These signals are applied to a subtractor 58 through analog switches SW1 and SW2, capacitors C1 and C2 and buffer amplifiers 54 and 56 and a difference output from the subtractor 58 is detected as a tracking error signal.

The analog switches SW1 and SW2 are connected to contacts a during the pit period and the fall time Δt of the reflected beam waveform to provide the detected signal without holding and, accordingly, momentary changes of tracking error signals are directly provided. The analog switches SW1 and SW2 are connected to contacts b during the bottom period excluding the fall time Δt of the reflected beam waveform. In this case, immediately preceding signals are held by the capacitors C1 and C2 and the tracking error signals held at a predetermined value are provided.

Figure 6:
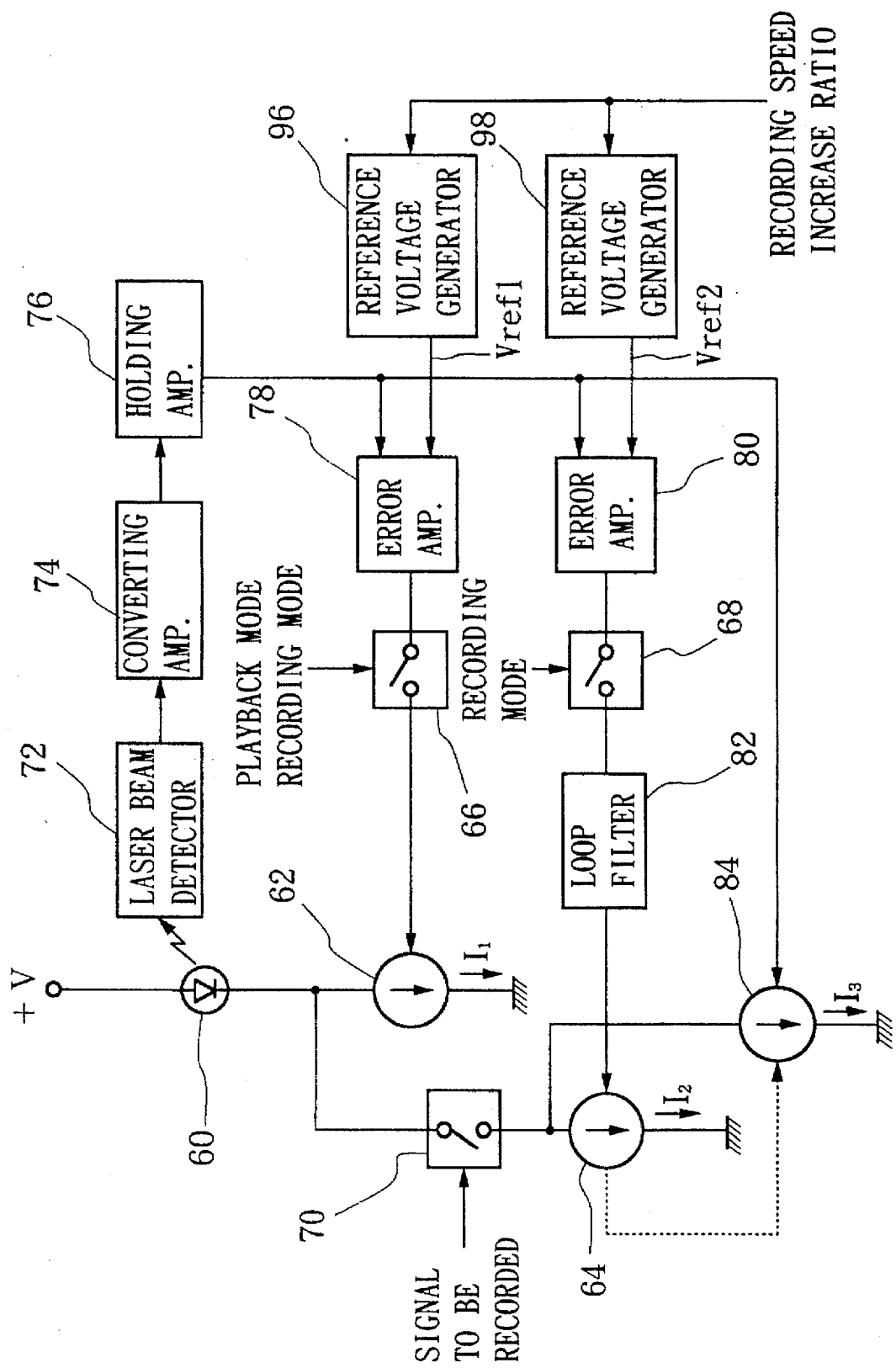
FIG. 6 is a circuit diagram showing an example of a laser power control circuit 25 of FIG. 1.

An example of the laser power control by the laser power control section 25 of FIG. 1 is shown in FIG. 6. To a laser diode 60 in the optical head 13 are connected constant current circuits 62, 64 and 84 in parallel and these constant current circuits 62, 64 and 84 are driven by a power source +V. The constant current circuit 62 serves as a playback drive current source and supplies a drive current $I_1$ corresponding to reference voltage Vref1 produced by a reference voltage generator 96. The constant current circuit 64 supplies a drive current $I_2$ corresponding to reference voltage Vref2 produced by a reference voltage generator 98 and constitutes a recording drive current source in combination with the constant current circuit 62. The constant current circuit 84 supplies a drive current $I_3$ which serves as a compensation current for compensating for a delay portion in rising of the laser power (pit power) when the operation mode of the device is changed from the playback mode to the record mode.

In the playback mode, the switch 66 is on and the switch 68 is off and the constant current circuit 62 only is in operation so that the laser diode 60 is continuously driven with only the playback drive current $I_1$. This playback drive current $I_1$ causes the laser diode 60 to produce a laser beam output of a relatively low power (i.e., the bottom power) which is lower than a threshold value for recording and is sufficient for playback only.

In the recording mode, the switch 66 is on and the constant current circuit 62 is continuously driven. The switch 68 is also on and the constant current circuit 64 is driven intermittently according to turning on and off of the switch 70 by a signal to be recorded. Therefore, in the recording mode, a signal current of the current value $I_2$ is superposed on the dc current of the current value $I_1$ to drive the laser diode 60. The value $I_1+I_2$ causes the laser diode 60 to produce a laser beam output (pit power) larger than the threshold value for recording and and thereby enables recording on the optical disk 10.

In the recording mode, the values of the reference voltages Vref1 and Vref2 are changed in accordance with the recording speed increase ratio. In other words, the reference voltage generator 96 increases the value of the reference voltage Vref1 as the recording speed increase ratio increases. This causes both the pit power and the bottom power to be increased with the increase of the recording speed increase ratio. The value of the reference voltage Vref1 is set to values which are sufficiently low to prevent an erroneous forming of a pit in the bottom period at each of the recording speed increase ratios. The reference voltage generator 98 causes the reference voltage Vref2 to be changed in accordance with the recording speed increase ratio to compensate for shortage or surplus in the pit power to provide an optimum pit power at each recording speed increase ratio when increase in the reference voltage Vref1 produces such shortage or surplus.

In the ALPC circuit, the output of the laser diode 60 is detected by a laser beam detector 72 and applied to error amplifiers 78 and 80 through a converting amplifier 74 and a holding amplifier 76. The error amplifiers 78 and 80 produce errors between the detected laser beam output and the reference voltages Vref1 and Vref2 and cause the constant current values $I_1$ and $I_2$ to be changed in accordance with these errors to maintain the laser beam output at a constant value.

In switching the operation mode from the playback mode to the recording mode for the write-once recording on the disk 10, the compensation current source 84 is driven for compensating for the delay in rising of the laser beam output immediately after switching of the operation mode. The compensation current source 84 supplies to the diode 60 a current value corresponding to difference between the current value of the constant current circuit 64 and a predetermined drive current reference value as the current $I_3$.

The operation of the circuit of FIG. 6 is shown in FIGS. 7A to 7C. When it is desired to carry out the write-once recording, the laser diode 60 is initially driven in the playback mode (0.7 mW in this example) to feed the optical head 13 radially outwardly from the innermost position for conducting a search for an end point of a recorded portion. Upon detecting a track in which the end point of the recorded portion exists, a pause state is brought about (i.e., the same track is traced). Then, drive of the laser diode 60 is changed to the recording mode at a timing of passing the end point of the recorded portion for switching the operation mode to the recording mode to start recording.

Figure 7:
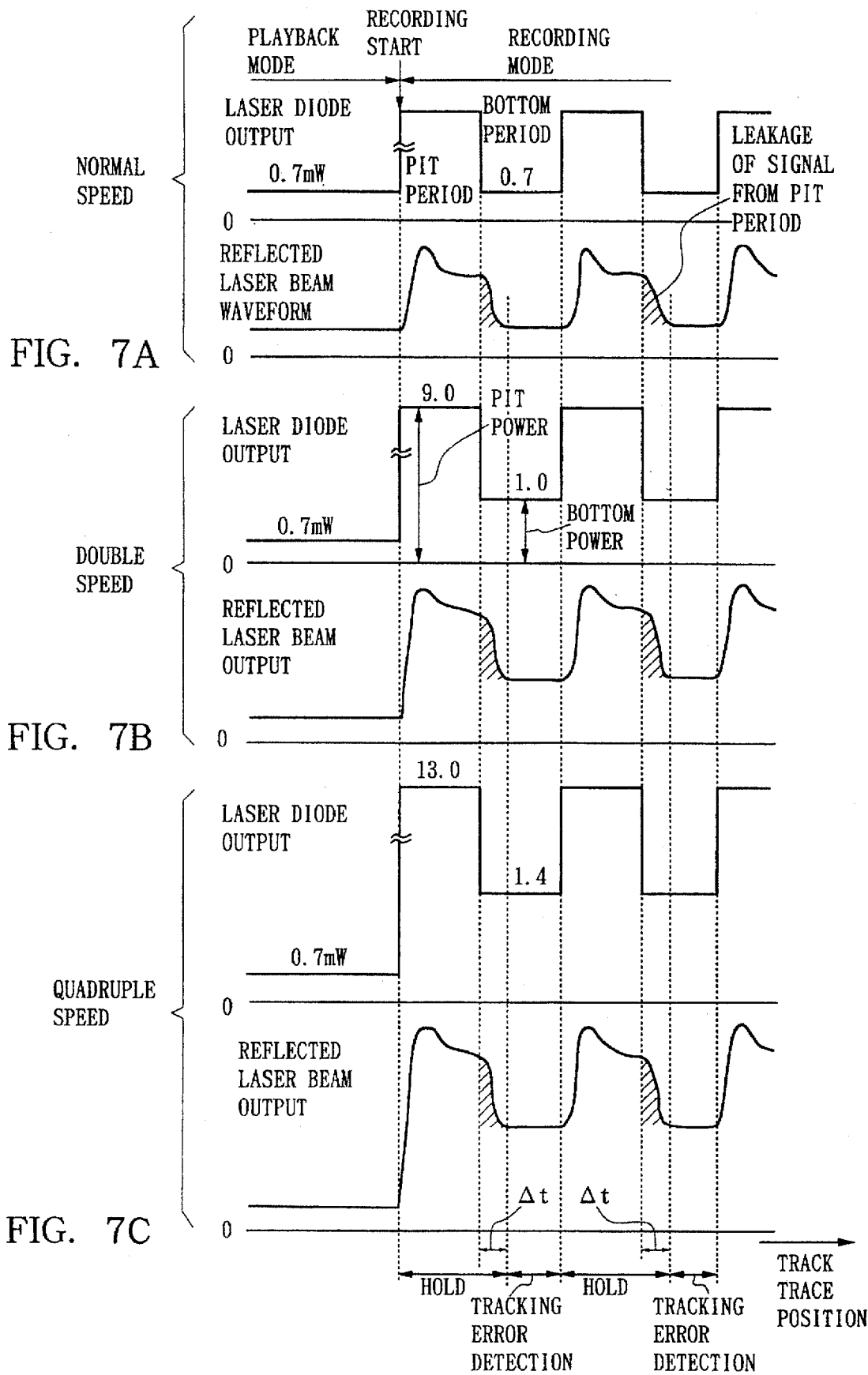
FIGS. 7A to 7C are waveform diagrams showing an example of a laser power control by the circuit of FIG. 6.

In the example of FIG. 7, the pit power and the bottom power are changed in the following manner in accordance with the recording speed increase ratio.

|  | pit power | bottom power |
| --- | --- | --- |
| Normal speed | 6.5 | 0.7 |
| double speed | 9.0 | 1.0 |
| quadruple speed | 13.0 | 1.4 |

According to this change of the laser power, not only the pit power but also the bottom power are increased as the recording speed increase ratio increases and, therefore, difference between the pit power and the bottom power is reduced as compared with a case where the pit power only is increased. Accordingly, the fall time $\Delta t$ of the reflected beam waveform undergoes little change and an adequate period of time is available for detecting a tracking error even at a high recording speed increase ratio. This ensures an excellent signal-to-noise ratio in the wobble signal. Further, since the bottom power is increased, a sharp leading edge of the pit power for a next pit period can be obtained with resulting reduction in the delay in the pit start position.

Figure 8:
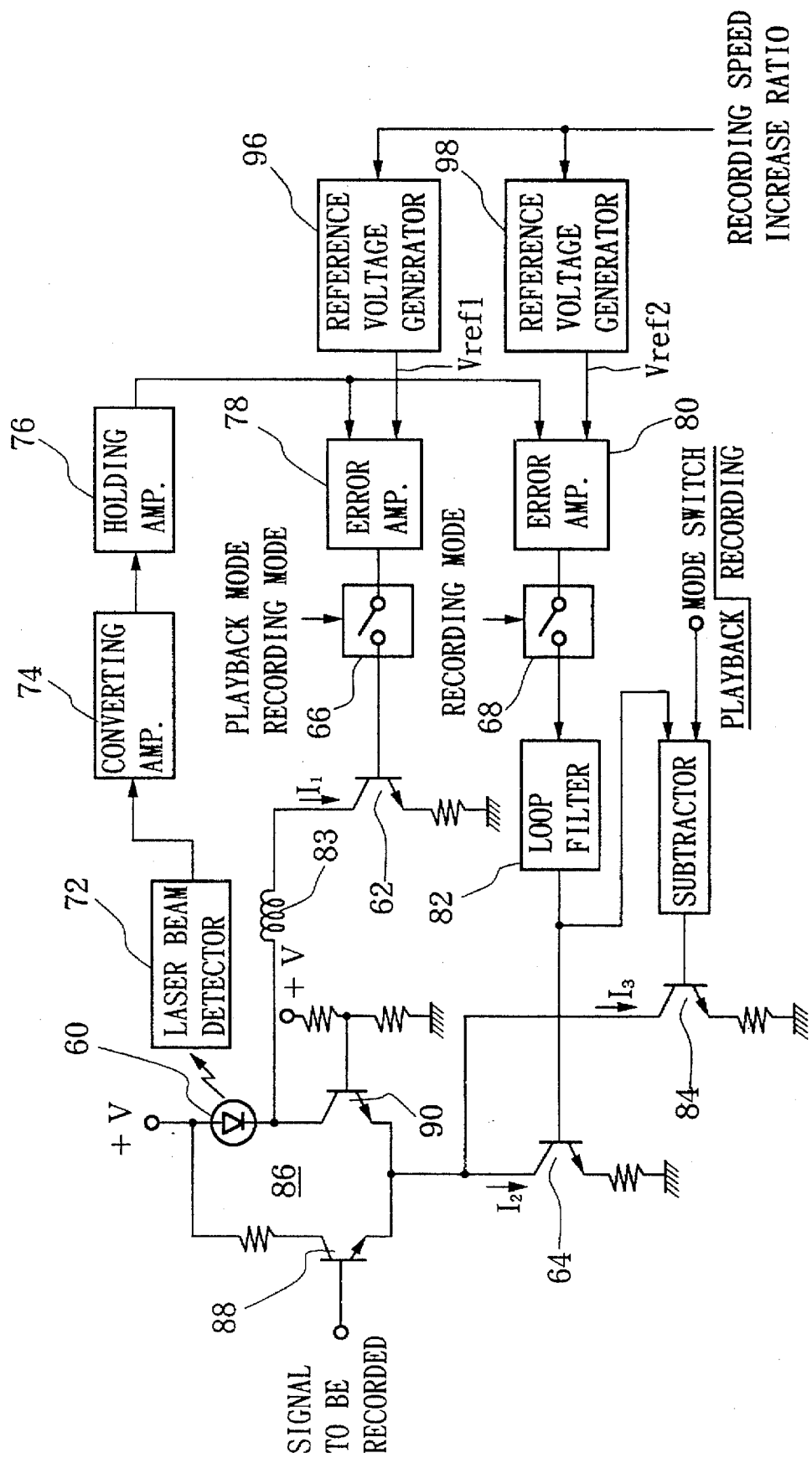
FIG. 8 is a circuit diagram showing a specific example of the circuit of FIG. 6.

A specific example of the circuit of FIG. 6 is shown in FIG. 8. A signal to be recorded is applied to one transistor 88 which constitutes a differential amplifier 86 with another transistor 90. A laser diode 60 is inserted on the collector side of the other transistor 90 and is driven in response to the signal to be recorded.

Two constant current circuits consisting of transistors 64 and 84 are connected to a common emitter of the differential amplifier 86. To the cathode of the laser diode 60 is connected a constant current circuit consisting of a transistor 60 through an inductance 83. This inductance 83 is provided for preventing an undesirable influence by the switching operation current on the side of the differential amplifier 86 on the constant current circuit consisting of the transistor 62.

Among these constant current circuits, the transistor 62 supplies the playback drive current $I_1$, the transistor 64 the current $I_2$ in the recording drive current $I_1+I_2$ and the transistor 84 the compensation current $I_3$. An integration type loop filter 82 is inserted in a control path of the drive current $I_2$ and the compensation current $I_3$ is controlled by the output of this loop filter 82. The loop filter 82 is provided for stabilizing the ALPC loop characteristics and preventing possible flow of rush current to the laser diode 60 and resulting damage to the laser diode 60 or shortening of its life in the case of unexpected conduction of the switch 68.

This loop filter 82 caused a delay in rising of the drive current $I_2$ in switching from the playback mode to the recording mode. Since, however, the output of the loop filter 82 is applied to a subtractor 94 which receives also a mode switching signal as a reference signal, the transistor 84 is controlled by a difference output from the subtractor 94 to supply the compensation current $I_3$ and, therefore, the delay in rising of the drive current $I_2$ is corrected.

In the above described embodiment, recording is made on the basis of the CD-WO standard. This invention however is applicable to recording on an optical disk on the basis of other standards.

In the above described embodiment, recording is made on a dye type optical disk. The invention however is applicable to various other types of optical disks including a metal type optical disk.

In the above described embodiment, the tracking error detection is made in the bottom period. The invention is applicable also to an optical disk recording device in which the tracking error detection in the bottom period is not made. In this case, the advantageous result that a sharp leading edge in the pit power for a next pit period is obtained with resulting reduction in the delay in the pit start position can still be obtained.

In the above described embodiment, the pit level and the bottom level are increased over the entire pit period and bottom period. Alternatively, the pit level and/or the bottom level may be increased in only a part of the pit period and/or the bottom period. For example, if the laser power in a former half of the bottom period is increased, the trailing edge of the reflected laser beam waveform will be shortened and, if the laser power in a latter half of the bottom period is increased, the leading edge of the pit power in a next pit period will become sharpened.

In the above described embodiment, no particular consideration has been given to the linear velocity. A control may additionally be made so that the pit power and the bottom power will be changed in accordance with the linear velocity (1.2 m/s to 1.4 m/s in the CD-WO standard), i.e., the pit power and the bottom power will be increased as the linear velocity is increased.

What is claimed:

1. An optical disk recording device for forming a pit on an optical disk by projecting a recording laser beam above a threshold value for recording of an amount corresponding to a pit length of the pit to be formed, the device comprising:

recording speed increase ratio setting means for setting a recording speed increase ratio;

rotation control means for rotating the optical disk at a recording speed increase ratio set by the recording speed increase ratio setting means; and laser power control means for controlling laser power of the recording laser beam to increase above the threshold value for recording in a pit period and laser power of the recording laser beam to decrease below the threshold value for recording in a bottom period such that both the laser power in at least a part of the pit period and the laser power in at least a part of the bottom period will be increased as the set recording speed increase ratio is increased, wherein the laser power control means produces the recording laser beam at different power levels for each recording speed increase ratio for both the pit period and the bottom period so that any given radial distance can be exposed to a plurality of different pit period power levels and a plurality of different bottom period power levels based upon an increase in the recording speed increase ratio, and wherein the pit period power level and the bottom period power level are changed by a same proportional amount based upon a change in the recording speed increase ratio.

2. An optical disk recording device as defined in claim 1, further comprising:

tracking error detection means for detecting a tracking error from the laser beam reflected from the optical disk and producing a tracking error signal; and tracking error signal holding means for passing the tracking error signal during a bottom period excluding a fall time of the reflected laser beam, and holding and outputting an immediately preceding tracking error signal during a pit period and the fall time of the reflected laser beam during the bottom period.

3. An optical disk recording device as defined in claim 1, which further comprises laser power generation means, and wherein said laser power control means comprises:

first reference voltage generation means for generating a first reference voltage which is increased with the increase in the recording speed increase ratio;

playback current supply means responsive to the first reference voltage for supplying a drive current for playback which causes the laser power generation means to produce the laser power which is smaller than the threshold value for recording;

second reference voltage generation means for generating a second reference voltage; and recording current supply means responsive to the first and second reference voltages for supplying a drive current for recording which causes the laser power generation means to produce the laser power which is larger than the threshold value for recording.

4. An optical disk recording device as defined in claim 3, further comprising:

compensation current supply means for supplying a drive current to the laser power generation means for compensating for a delay in a rising of the laser power caused when switching an operation mode of the optical disk recording device from a playback mode to a recording mode.

5. An optical disk recording device as defined in claim 1, wherein recording is made on the basis of CD-WO standard.

6. An optical disk recording device for forming a pit on an optical disk by projecting a recording laser beam above a threshold value for recording of an amount corresponding to a pit length of the pit to be formed, the device comprising:

recording speed increase ratio setting means for setting a recording speed increase ratio;

rotation control means for rotating the optical disk at a recording speed increase ratio set by the recording speed increase ratio setting means; and laser power control means for controlling laser power of the recording laser beam to increase above the threshold value for recording in a pit period and laser power of the recording laser beam to decrease below the threshold value for recording in a bottom period such that both the laser power in at least a part of the pit period and the laser power in at least a part of the bottom period will be increased as the set recording speed increase ratio is increased, wherein the laser power control means produces the recording laser beam at different power levels for each recording speed increase ratio for both the pit period and the bottom period so that any given radial distance can be exposed to a plurality of different pit period power levels and a plurality of different bottom period power levels based upon an increase in the recording speed increase ratio, wherein the optical disk is recorded in a CLV format, and wherein the pit period power level and the bottom period power level are changed by a same proportional amount based upon a change in the recording speed increase ratio.

7. An optical disk recording device for forming a pit on an optical disk by projecting a recording laser beam above a recording threshold for a duration corresponding to a pit length of the pit to be formed on the optical disk, the device comprising:

a recording speed ratio setting circuit that sets a recording speed ratio;

a rotation control circuit that rotates the optical disk at the recording speed ratio set by the recording speed ratio setting circuit; and a laser power control circuit that controls a laser power level of the recording laser beam to increase above the recording threshold during a pit period and to decrease below a recording threshold during a bottom period such that the laser power in at least a part of the pit period and in at least a part of the bottom period will be changed proportionally with the set recording speed ratio, wherein the laser power control circuit produces the recording laser beam at different power levels for each recording speed ratio for both the pit period and the bottom period so that any given radial distance can be exposed to a plurality of different pit period power levels and a plurality of different bottom period power levels based upon a change in the recording speed ratio, and wherein the pit period power level and the bottom period power level are changed by a same proportional amount based upon a change in the recording speed increase ratio.

8. An optical disk recording device as defined in claim 7, further comprising:

a tracking error detection circuit that detects a tracking error from the laser beam reflected from the optical disk and that produces a tracking error signal; and a tracking error signal holding circuit that passes the tracking error signal during a part of the bottom period, excluding a part accounting for a fall time of the reflected laser beam, and holding and outputting an immediately preceding tracking error signal during the pit period and the fall time of the reflected laser beam during the excluded part of the bottom period.

9. An optical disk recording device as defined in claim 7, further including a laser power generation circuit, and wherein the laser power control circuit includes:

a first reference voltage generation circuit that generates a first reference voltage which is changed with the change in the recording speed ratio;

a playback current supply that responds to the first reference voltage for supplying a drive current for playback which causes the laser power generation circuit to produce the laser power at a level which is lower than the recording threshold;

a second reference voltage generation circuit that generates a second reference voltage; and a recording current supply that responds to the first and second reference voltages for supplying a drive current for recording which causes the laser power generation circuit to produce the laser power at a level which is higher than the recording threshold.

10. An optical disk recording device as defined in claim 9, further including:

a compensation current supply that supplies a drive current to the laser power generation circuit to compensate for a delay in a rising of the laser power caused when switching an operation mode of the optical disk recording device from a playback mode to a recording mode.

11. An optical disk recording device as defined in claim 7, wherein a recording is made on the basis of CD-WO standard.

12. An optical disk recording device for forming a pit on an optical disk by projecting a recording laser beam above a recording threshold for a duration corresponding to a pit length of the pit to be formed on the optical disk, the device comprising:

a recording speed ratio setting circuit that sets a recording speed ratio;

a rotation control circuit that rotates the optical disk at the recording speed ratio set by the recording speed ratio setting circuit; and a laser power control circuit that controls a laser power level of the recording laser beam to increase above the recording threshold during a pit period and to decrease below a recording threshold during a bottom period such that the laser power in at least a part of the pit period and in at least a part of the bottom period will be changed proportionally with the set recording speed ratio, wherein the laser power control circuit produces the recording laser beam at different power levels for each recording speed increase ratio for both the pit period and the bottom period so that any given radial distance can be exposed to a plurality of different pit period power levels and a plurality of different bottom period power levels based upon an increase in the recording speed increase ratio, wherein the optical disk is recorded in a CLV format, and wherein the pit period power level and the bottom period power level are changed by a same proportional amount based upon a change in the recording speed increase ratio.

13. A method of forming a pit on an optical disk by projecting a recording laser beam above a recording threshold for a duration corresponding to a pit length of the pit to be formed on the optical disk, the method comprising the steps of:

setting a recording speed ratio;

rotating the optical disk at the set recording speed ratio; and controlling a laser power level of the recording laser beam to increase above the recording threshold during a pit period and to decrease below the recording threshold during a bottom period such that both the laser power in at least a part of the pit period and in at least a part of the bottom period are changed proportionally with the set recording speed ratio, wherein the step of controlling the laser level produces the recording laser beam at different power levels for each recording speed ratio for both the pit period and the bottom period so that any given radial distance can be exposed to a plurality of different pit period power levels and a plurality of different bottom period power levels based upon a change in the recording speed ratio, and wherein the pit period power level and the bottom period power level are changed by a same proportional amount based upon a change in the recording speed increase ratio.

14. A method as defined in claim 13, further including the steps of:

detecting a tracking error from the laser beam reflected from the optical disk;

producing a tracking error signal from the tracking error;

passing the tracking error signal during a part of the bottom period excluding a part accounting for a fall time of the reflected laser beam; and holding and outputting an immediately preceding tracking error signal during the pit period and the fall time of the reflected laser beam portion during the excluded part of the bottom period.

15. A method as defined in claim 13, further including the steps of:

generating a first reference voltage which is changed with the change in the recording speed ratio;

supplying a drive current for playback in response to the first reference voltage to produce the laser power at a level which is lower than the recording threshold;

generating a second reference voltage; and supplying a drive current for recording in response to the first and second reference voltages to produce the laser power at a level which is higher than the recording threshold.

16. A method as defined in claim 15, further including the step of supplying a drive current for compensating for a delay in a rising of the laser power caused when switching an operation mode of the recording laser beam from a playback mode to a recording mode.

17. A method of forming a pit on an optical disk by projecting a recording laser beam above a recording threshold for a duration corresponding to a pit length of the pit to be formed on the optical disk, the method comprising the steps of:

setting a recording speed ratio;

rotating the optical disk at the set recording speed ratio; and controlling a laser power level of the recording laser beam to increase above the recording threshold during a pit period and to decrease below the recording threshold during a bottom period such that both the laser power in at least a part of the pit period and in at least a part of the bottom period are changed proportionally with the set recording speed ratio, wherein the step of controlling the laser level produces the recording laser beam at different power levels for each recording speed ratio the both the pit period and the bottom period so that any given radial distance can be exposed to a plurality of different pit period power levels and a plurality of different bottom period power levels based upon a change in the recording speed ratio, wherein the optical disk is recorded in a CLV format, and wherein the pit period power level and the bottom period power level are changed by a same proportional amount based upon a change in the recording speed increase ratio.

* * * * *